US008838378B2

(12) United States Patent
Yuasa

(10) Patent No.: US 8,838,378 B2
(45) Date of Patent: Sep. 16, 2014

(54) SYSTEM AND METHOD FOR CONTROLLING THE TRANSMISSION OF TRAFFIC INFORMATION TO A VEHICLE NAVIGATION SYSTEM

(71) Applicant: Honda Motor Co., Ltd., Tokyo (JP)

(72) Inventor: Go Yuasa, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/746,066

(22) Filed: Jan. 21, 2013

(65) Prior Publication Data

US 2014/0207369 A1    Jul. 24, 2014

(51) Int. Cl.
*G08G 1/01*    (2006.01)
*G01C 21/34*    (2006.01)

(52) U.S. Cl.
CPC .................................. *G01C 21/3407* (2013.01)
USPC ........................................... 701/414; 701/118

(58) Field of Classification Search
CPC ........... G01C 21/3407; G01C 21/3415; G01C 21/3492; G01C 21/3626; G01C 21/26; G01C 21/28
USPC .................. 701/117–119, 411, 414, 420, 423
See application file for complete search history.

(56) References Cited

U.S. PATENT DOCUMENTS

| 6,278,941 | B1 | 8/2001 | Yokoyama |
| 6,859,720 | B2 | 2/2005 | Satoh et al. |
| 7,800,514 | B2 * | 9/2010 | Lyle et al. ..................... 340/905 |
| 7,894,981 | B2 | 2/2011 | Yamane et al. |
| 8,036,820 | B2 * | 10/2011 | Sera ............................... 701/117 |
| 2003/0195925 | A1 | 10/2003 | Kaneko et al. |
| 2006/0190169 | A1 | 8/2006 | Kawai |
| 2008/0004791 | A1 * | 1/2008 | Sera ............................... 701/117 |
| 2008/0183375 | A1 | 7/2008 | Okude et al. |
| 2008/0270015 | A1 * | 10/2008 | Ishikawa et al. ............. 701/119 |
| 2009/0024322 | A1 | 1/2009 | Tomita et al. |
| 2010/0138140 | A1 | 6/2010 | Okuyama |
| 2010/0332121 | A1 | 12/2010 | Okude et al. |
| 2011/0213550 | A1 * | 9/2011 | Ishizuka ....................... 701/201 |
| 2013/0316696 | A1 * | 11/2013 | Huang et al. ................. 455/419 |

FOREIGN PATENT DOCUMENTS

| JP | 9-274697 A | 10/1997 |
| JP | 10-82650 A | 3/1998 |
| JP | 2003-28655 A | 1/2003 |
| JP | 2003-187396 A | 7/2003 |

* cited by examiner

*Primary Examiner* — Mary Cheung
*Assistant Examiner* — Rodney Butler
(74) *Attorney, Agent, or Firm* — Standley Law Group LLP

(57) ABSTRACT

Systems and methods for improved vehicle navigation using mobile communication device (e.g., phone) technology as a means for transmitting vehicle route data that has been updated as a result of changed or changing traffic conditions. A mobile communication device is connected between a vehicle and a remote server. Traffic information from both broadcast and mobile network sources is analyzed by the server, a difference(s) therebetween is detected, and the difference(s) is compared to a predetermined difference value. If the detected difference exceeds the predetermined difference value, difference information is extracted and used to produce updated route data, which is then transmitted via the mobile communication device to the vehicle. The transmission of updated route data is limited to only situations where there is a sufficient change in traffic conditions, and the data transmitted is preferably limited to only difference data so as to avoid exceeding mobile communication device plan limits.

20 Claims, 2 Drawing Sheets

SYSTEM AND METHOD FOR CONTROLLING THE TRANSMISSION OF TRAFFIC INFORMATION TO A VEHICLE NAVIGATION SYSTEM

TECHNICAL FIELD

The present invention is directed to systems and methods for controlling how traffic information, such as traffic information embodied in navigation route guidance data, is transmitted to a vehicle.

BACKGROUND

Traditional vehicle navigation systems have typically included a processing device (CPU) that controls the navigation functions, a storage device (e.g., hard drive, CD-ROM, DVD-ROM) for storing map data, a global positioning system (GPS) receiver for locating the position of the vehicle, a display device (e.g., LCD screen) for displaying the location of the vehicle and a calculated route, a speaker, and various sensors for detecting vehicle direction and vehicle speed. In use, the CPU uses the vehicle location, the coordinates of a desired destination, and stored map data, to calculate a route of travel.

Satellite-based or radio-based (broadcast) traffic information may also be used in calculating a route. The location of the vehicle is then shown superimposed over a map image on the display device along with the calculated path of travel, and movement of the vehicle is reflected as a change of position of the vehicle on the map image, which is updated as movement of the vehicle progresses.

One downside to traditional onboard vehicle navigation systems is the relatively high cost typically associated therewith. Consequently, less complex and lower cost vehicle navigation systems have recently gained interest. In these systems, many of the functions typically performed by the onboard navigation system are performed off-board (remotely), such as by a server located at a central station (i.e., information processing/distribution center). More specifically, the central station may be equipped with a database of map data and any other technology necessary to receive a route calculation request from a vehicle, to calculate a route, and to transmit the calculated route to the vehicle. In this manner, the vehicle need only be capable of sending location and destination information to the central station and of receiving route guidance information from the central station. The cost to the purchaser of a vehicle of such a server-based navigation system may thus be greatly reduced in comparison to the cost of a traditional onboard vehicle navigation system.

While many of the traditional navigation system components may be removed from a vehicle in such a server-based vehicle navigation system, a means of communication between the vehicle and the central station must still be provided. It is being increasingly suggested that these communications occur via a mobile communication device (e.g., a mobile phone), which may be connected to the central station via the Internet, etc., and to a vehicle by a wired or wireless link (e.g., Bluetooth®). The mobile phone may be provided with particular software that allows or enhances its ability to function in this manner. Consequently, it is possible to use a mobile phone as a communications conduit between a vehicle and a remotely located central station, to display map and route guidance information received from the central station via the mobile phone on a display device located in the vehicle, and to broadcast audible route guidance and/or other associated navigation communications over a vehicle's speaker system.

One problem with using a mobile phone as a primary navigation data communications conduit between a vehicle and a remotely located central station is that the amount of navigation data that must be exchanged between the central station and the vehicle is typically quite large. This is problematic for multiple reasons. First, the time required to download the necessary navigation data and to periodically update the navigation data may be significant, which might result in guidance problems. Second, many if not most mobile phone usage plans place a limit on the amount of data that may be transmitted within a given time period without incurring additional fees. Consequently, because of the large amount of navigation data that must typically be transferred in such a server-based vehicle navigation system, the use of a mobile phone as a communications conduit may result in significant data transfer overage fees.

To this end, a number of modifications have been proposed with respect to minimizing the amount of data that must be transferred when using a server-based vehicle navigation system. These modifications have generally focused on minimizing the amount of map and/or basic route information that must be transmitted between a central station and a vehicle, such as by limiting the data sent to data related only to a geographic area in close proximity to the current location of the vehicle.

In the case of a traditional vehicle navigation system or a server-based vehicle navigation system, delivering traffic information to a vehicle may be beneficial for a number of reasons including, for example, because such information may be used to determine or alter a route traveled by the vehicle. While basic traffic information, alerts, etc., may simply be broadcast over one or more radio frequencies for receipt and use by a vehicle operator, traffic information may also be utilized by vehicle navigation systems to enhance route calculation in a manner that avoids delays resulting from traffic problems (accidents, congestion, construction, etc.).

For use in electronic navigation, traffic information must be gathered and provided to a vehicle's navigation system. Traffic information available to onboard vehicle navigation systems has typically been transmitted via satellite or within FM radio signals—i.e., via radio data system (RDS) or radio broadcast data system (RBDS) signals. In another system, one or a plurality of (probe) vehicles equipped with on-board navigation and a telecommunications unit (e.g., an embedded phone) may transmit to a remote server various data relating to the travel of the vehicle. This data may include, for example, the location, speed and route of the vehicle. As the vehicle periodically transmits this data to the remote server, the server can use the vehicle's location, the time required for the vehicle to travel from one reporting point to the next, and the known speed limit for the route traveled by the vehicle, to determine whether there is a traffic problem in the area of the vehicle.

Traffic information may also be provided to vehicle navigation systems over mobile networks, so that a mobile communication device (e.g., mobile phone) carried by a vehicle operator may be accessed to view traffic information or may be used to provide traffic information to a vehicle navigation system. Traffic information provided in this manner may differ from the traffic information provided by traditional satellite or broadcast traffic information. For example, as the remote server described above receives more information from the various probe vehicles in a given area, the server may aggregate the data, make a conclusion about traffic conditions and, if appropriate, send back via the telecommunications units thereof, updated route guidance instructions to the same vehicles from which the data was received. Additionally, such a system may also send the same updated route guidance information to other vehicles in the area that are not equipped with an onboard telecommunications unit by making use of a non-embedded mobile communication device, such as an occupant's mobile phone. Because traffic information transmitted in this manner may be updated more frequently (is newer) than traffic information obtained from a broadcast signal, this information can be advantageous to most accurately calculating a navigation route that bypasses traffic problems.

Whether a mobile communication device such as a mobile phone is used to deliver traffic-based navigation information to a traditional vehicle navigation system or is part of a server-based vehicle navigation system, the aforementioned problems associated with data transfer rates, data transfer limitations, and excess usage fees, still exist. While consideration has been given to reducing the amount of general map or route data that must be transferred by a mobile phone in a server-based vehicle navigation system, no such consideration appears to have been given to the transmission of navigation data updates resulting from changes in traffic conditions. That is, when route calculation and guidance is based at least in part on traffic conditions, no consideration has been given to reducing the more frequent updating of calculated route data that will typically be required to accurately avoid traffic problems.

There is thus a need for a system and method whereby the amount of navigation data transmitted by a server-based vehicle navigation system as a result of changing traffic conditions may be minimized. Systems and methods of the present invention satisfy this need.

SUMMARY

Embodiments of the invention are directed to improved vehicle navigation systems and methods that use mobile communication device (e.g., mobile phone) technology as a means for transmitting vehicle route data that has been updated as a result of changed or changing traffic conditions. However, unlike known systems and methods where route guidance updates based on changes in traffic conditions result in the frequent transmission of large amounts of data, systems and methods of the present invention gather traffic information from both broadcast and mobile network sources (e.g., probe vehicles), and compare the traffic information for a given area before determining if and to what extent a route guidance update is required.

When a destination mapping (route guidance) request is set at an onboard vehicle navigation system, the navigation system may calculate the route itself or it may request a route from a network source, such as by using a mobile communication device to connect to a server at a central station or similar location. According to the invention, when a route guidance request from a navigation system is received at a remote server, an original (normal) route and an optimized route are calculated. The normal route does not consider traffic information gathered from mobile network sources such as probe vehicles, while the optimized route does.

The server obtains broadcast traffic information as well as traffic information from a mobile network source(s). The server compares the traffic information from the mobile network source(s) to the broadcast traffic information to determine if there is a difference therebetween and, if there is, whether the difference exceeds some predetermined value. If it does, the difference (updated) information is extracted and used to produce updated route data, which is then transmitted via a mobile communication device to an associated vehicle traveling in the area affected by a detected traffic condition. Preferably, only difference data is sent. The updated route data is then used at the vehicle to modify the displayed map accordingly, and to initiate guidance based on the optimized route. By limiting the transmitted information to only data that truly needs to be updated as a result of sufficient changes in traffic conditions, the amount of navigation data sent via a mobile communication device can be minimized to avoid exceeding mobile communication device plan limits or incurring excess usage fees.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Exemplary systems and methods of the invention may involve onboard vehicle navigation systems that include onboard and embedded telecommunications units (TCUs), as well as vehicle navigation systems without embedded telecommunications units. In the former case, a remote server may send certain route guidance data to the onboard navigation device via the embedded TCU, and may also receive vehicle information (e.g., position and speed) via the embedded TCU. In the latter case, a non-embedded mobile communication device (e.g., mobile phone) may act as the communications conduit between a vehicle navigation device and a remote server, with route calculations, etc., being performed at the remote server and transmitted to the vehicle via the mobile communication device. As used above and in the following example, the terminology "vehicle navigation device" may refer to an onboard device having, for example, components such as a processor, stored map data, a GPS receiver, and a display device for displaying a location of the vehicle and a calculated route on a map. A speaker for delivering audible route guidance instructions to a user may also be provided, or a connection to the vehicle's stereo system may be used instead.

Figure 1:
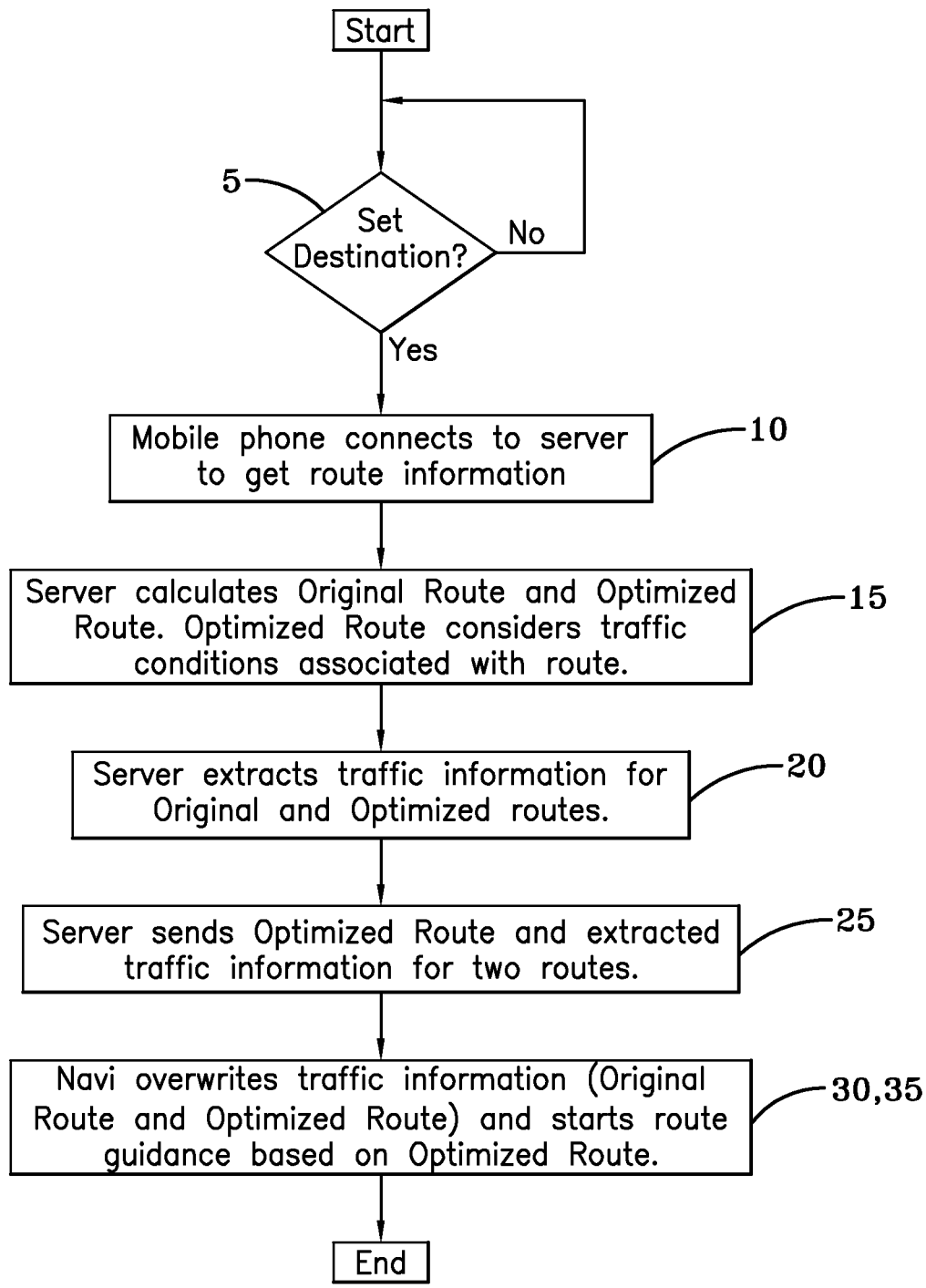
FIG. 1 is a flowchart illustrating the steps of employing one exemplary method of the invention.

The basic steps of one exemplary method of the invention are set out in FIG. 1. As shown, the initial step in the navigation process is the selection of a destination 5. Once a destination is set, the vehicle navigation device connects to a remotely located server via the embedded TCU or non-embedded mobile communication device to get initial route information 10 for guiding the vehicle from its current location to the desired destination. As would be understood by one of skill in the art, the current location of the vehicle is also provided to the server, as is the speed of the vehicle if moving. The server may include a processing unit (e.g., CPU), a database of map information, memory, a transceiver, and any other technology necessary to communicate with the vehicle navigation device and to perform the functions described below.

Upon receipt of the desired destination and the current location of the vehicle, the server proceeds to calculate both an original route and an optimized route 15. The original route is determined as the best route to the destination without regard to traffic conditions as reported by mobile network sources such as probe vehicles. In contrast, the optimized route is determined as the best route to the destination with consideration given to traffic conditions as reported to the server by mobile network sources such as probe vehicles. Consequently, depending on the distance between the current location of the vehicle and the desired destination, the optimized route may be largely duplicative of the original route, but with one or more deviations designed to avoid traffic problems. The server then extracts the traffic information associated with the two routes 20.

Once the optimized route is calculated and the traffic information for the two routes is extracted, the server transmits the optimized route data and the extracted traffic data for the two routes to the vehicle navigation device 25 by way of the embedded (e.g., TCU) or non-embedded mobile communication device. In the case of first transmission, the traffic information for the two routes is written to the vehicle navigation device 30 and route guidance based on the optimized route is initiated 35. In the case of subsequent transmissions, the traffic information already saved with respect to the two routes may be overwritten if dictated by a change in traffic conditions. In such a case, only portions of the calculated route that are affected by changes in traffic conditions are overwritten and re-displayed. Route guidance then continues based on the updated route data.

Figure 2:
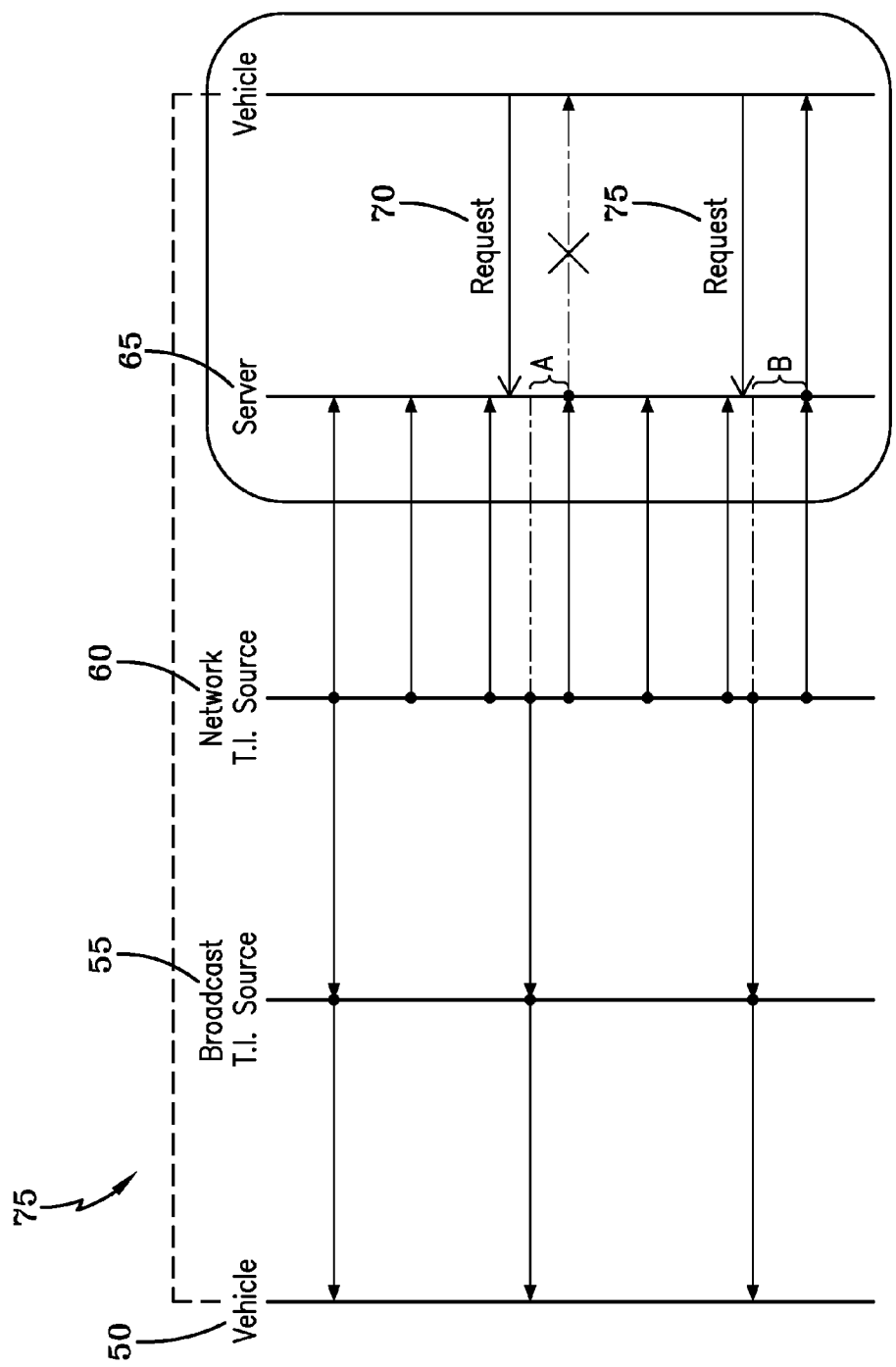
FIG. 2 graphically illustrates a comparison of broadcast and mobile network traffic information and a determination as to whether updated guidance information needs to be transmitted as a result.

Referring now to FIG. 2, it can be understood how systems and methods of the invention function to minimize the amount of navigation data that must be transmitted from the server to a vehicle navigation device. In this example, a vehicle 50 includes a navigation device that is capable of receiving broadcast traffic information (i.e., from satellite or radio) and displaying said traffic information on a displayed navigation device map. Traffic information from the broadcast source 55 is shown as being periodically transmitted to the vehicle 50. Additionally, a mobile network traffic source 60 such as a probe vehicle is also present and periodically communicates traffic information to a remote server 65 with which the vehicle is also in communication. In each case, and as should be understood by one of skill in the art, the traffic information provided by the broadcast source 55 and the mobile network source 60 includes traffic information that is relevant to a calculated route traveled by the vehicle 50.

As shown, and as previously described, traffic information provided by the mobile network source 60 is normally updated and sent more frequently than traffic information provided by the broadcast source 55. Consequently, the traffic information received by the server 65 is generally more up to date than the broadcast traffic information received and displayed by the vehicle navigation device. If a full set of navigation data is sent from the server to the vehicle navigation device via a mobile communication device each time there is any change in traffic conditions, it should also be understood that various problems may result. Such problems may include, but are not limited to, the aforementioned data transfer excess usage fees, etc.

Such problems may also include those associated with limited data transfer rates and resulting guidance instructions that may be based on updated route information not yet visible to a vehicle operator. That is, in the case of sending large amounts of navigation data, it is possible that the vehicle navigation device will receive and audibly provide updated route guidance instructions before the updated route can be displayed on a vehicle display device. As a result, it may appear to a vehicle operator that the vehicle navigation device is instructing the operator to needlessly deviate from the previously calculated and displayed route.

In order to avoid such problems, systems and methods of the invention operate to compare traffic information received by the server 65 from the mobile network source(s) 60 with traffic information provided by the broadcast source 55. Such a comparison may be performed by the server 65 only upon receipt of a request 70, 75 for navigation route data from the vehicle 50, or such a comparison may be regularly occurring and independent of any received requests. Data requests from a vehicle navigation device may be on-demand requests or recurring cyclical requests.

For purposes of comparing the traffic information from the different sources, the server is provided with some predetermined difference value below which the transmission of updated route guidance data will be deemed unnecessary and above which transmission of updated route guidance data will be deemed necessary. The difference value may be based on a variety of traffic conditions, such as traffic jam length, the number of accidents within a given area, etc. Thus, if a comparison between traffic information results in a difference in traffic jam length of 500 feet or less, for example, the predetermined value may be considered as not being exceeded and no data transmission need occur. The difference value may be comprised of several individual traffic condition factors, the exceedance of any one of which may mandate the transmission of updated route and traffic data. Alternatively, the difference value may be an aggregate of a number of individual traffic condition factors, and only if the aggregate value is exceeded will updated route and traffic data be transmitted.

FIG. 2 illustrates a first traffic information comparison performed by the server in response to a first request 70 for data. In this case, the first traffic information comparison resulted in a difference "A" that falls below the predetermined difference value. In other words, the most current traffic information provided by the mobile network source(s) was not sufficiently different from the most current traffic information provided by the broadcast source to warrant an update of the calculated route. Consequently, no updated navigation data is sent to the vehicle by the server in response to the first data request.

FIG. 2 also shows a second request for data having been sent to the server by the vehicle. As a result, the server again compares the most current traffic information provided by the mobile network source(s) with the most current traffic information provided by the broadcast source, and calculates a difference therebetween. In this case, however, the traffic information comparison performed by the server in response to the second request 75 for data resulted in a difference "B" that meets or exceeds the predetermined difference value. In other words, the most current traffic information provided by the mobile network source(s) is sufficiently different from the most current traffic information provided by the broadcast source to warrant an update of the calculated route. Consequently, updated navigation data is sent to the vehicle by the server in response to the second data request.

As previously described with respect to FIG. 1, and as represented in FIG. 2, it is preferred that only traffic information difference data and corresponding updated route data is transmitted by the server when a traffic information comparison results in a difference that exceeds the predetermined difference value. This minimizes the amount of data that must be transmitted, which helps to avoid excess data transfer fees associated with the mobile communication device and also minimizes the time required for the vehicle navigation device to update the displayed route and to initiate updated (optimized) route guidance instructions.

It can be understood from the foregoing description of exemplary embodiments that systems and methods of the invention permit the transmission over a mobile communication device of vehicle navigation route data that has been updated to account for traffic conditions, while simultaneously minimizing the amount of data that must be transmitted. Consequently, systems and methods of the invention reduce the likelihood that a user will exceed mobile communication device data transfer limits established by the device carrier or face excess usage charges associated therewith. By reducing the amount of data that must be transmitted to effect an update, systems and methods of the invention also help to ensure that the transmitted data will be received, displayed and acted upon as quickly as possible, making it more likely that displayed map data will coincide with updated audible route guidance instructions, etc.

While certain embodiments of the invention are described in detail above, the scope of the invention is not to be considered limited by such disclosure, and modifications are possible without departing from the spirit of the invention as evidenced by the following claims.

What is claimed is:

1. A vehicle navigation system comprising:
an onboard vehicle navigation device;
sensors for detecting and reporting vehicle speed and direction;
a broadcast source of traffic information;
a mobile network source of traffic information;
a remotely located server having a processor and memory, the server in communication with the broadcast source of traffic information and the mobile network source of traffic information, and further including a software program adapted to compare traffic information from the broadcast source with traffic information from the mobile network source, to detect a difference therebetween, and to compare any detected difference to a predetermined difference value; and
a mobile communication device in communication with the onboard vehicle navigation device and the server, the mobile communication device acting as a conduit for transmitting route guidance requests from the vehicle navigation device to the server, and for transmitting route guidance data from the server to the vehicle navigation device;
wherein, upon receipt of a request for updated route guidance data from the vehicle navigation device, the server is adapted to transmit updated route guidance data to the vehicle navigation device only when a detected difference between traffic information from the broadcast source and traffic information from the mobile network source is determined to exceed the predetermined difference value.

2. The vehicle navigation system of claim 1, wherein the sensors for detecting and reporting vehicle speed and direction are a part of the vehicle navigation device.

3. The vehicle navigation system of claim 1, wherein the sensors for detecting and reporting vehicle speed and direction are adapted to transmit data to the server via the mobile communication device.

4. The vehicle navigation system of claim 1, wherein the broadcast source of traffic information is satellite-based or FM radio-based.

5. The vehicle navigation system of claim 1, wherein the mobile network source of traffic information is comprised of one or more vehicles adapted to transmit vehicle travel information to the remotely located server via a mobile communication device.

6. The vehicle navigation system of claim 1, wherein the server includes a database of map data.

7. The vehicle navigation system of claim 1, wherein the predetermined difference value is based on a traffic condition selected from the group consisting of the length of a traffic jam and a number of traffic accidents within a given section of a calculated route.

8. The vehicle navigation system of claim 1, wherein the mobile communication device is a mobile phone.

9. The vehicle navigation system of claim 1, wherein the mobile communication device is in wired communication with the vehicle navigation device.

10. The vehicle navigation system of claim 1, wherein the mobile communication device is in wireless communication with the vehicle navigation device.

11. The vehicle navigation system of claim 1, wherein the server is adapted to send only difference data when transmitting updated route guidance data to the vehicle navigation device.

12. A vehicle navigation system comprising:
a vehicle navigation device, said device further comprising:
a processing device,
a storage device for storing map data,
a GPS receiver for locating the position of the vehicle, and
an onboard display device for displaying a location of the vehicle and a calculated route on a map;
a mobile communication device in communication with the onboard vehicle navigation device and the server, the mobile communication device acting as a conduit for transmitting route guidance requests from the vehicle navigation device to the server, and for transmitting route guidance data from the server to the vehicle navigation device;
a broadcast source of traffic information;
a mobile network source of traffic information; and
a remotely located server having a processor and a database of map data, the server in communication with the mobile communication device, the broadcast source of traffic information and the mobile network source of traffic information, the server further including a software program(s) adapted to perform route guidance calculations based on destination information and vehicle location information received from the mobile communication device, to compare traffic information from the broadcast source with traffic information from the mobile network source, to detect a difference therebetween, and to compare any detected difference to a predetermined difference value;
wherein, upon receipt of an initial request for route guidance data, the server is adapted to calculate a route and to transmit the route to the vehicle via the mobile communication device; and
wherein, upon receipt of a subsequent request for updated route guidance data from the mobile communication device, the server is adapted to transmit updated route guidance data to the mobile communication device only when a detected difference between traffic information from the broadcast source and traffic information from the mobile network source is determined to exceed the predetermined difference value.

13. The vehicle navigation system of claim 12, wherein the broadcast source of traffic information is satellite-based or FM radio-based.

14. The vehicle navigation system of claim 12, wherein the mobile network source of traffic information is comprised of one or more vehicles adapted to transmit vehicle travel information to the remotely located server via a mobile communication device.

15. The vehicle navigation system of claim 12, wherein the predetermined difference value is based on a traffic condition selected from the group consisting of the length of a traffic jam and a number of traffic accidents within a given section of a calculated route.

16. The vehicle navigation system of claim 12, wherein the mobile communication device is a mobile phone.

17. The vehicle navigation system of claim 12, wherein the mobile communication device is in wired communication with the vehicle navigation device.

18. The vehicle navigation system of claim 12, wherein the mobile communication device is in wireless communication with the vehicle navigation device.

19. The vehicle navigation system of claim 13, wherein the server is adapted to send only difference data when transmitting updated route guidance data to the mobile communication device.

20. A navigation method for navigating a vehicle, comprising:
    providing a calculated route to a destination via at least a map presented on a vehicle navigation device located onboard the vehicle;
    providing sensors for detecting and reporting vehicle speed and direction and, while navigating the route, using signals from the sensors to update the map;
    providing a broadcast source of traffic information;
    providing a mobile network source of traffic information;
    placing a remotely located server having a processor and memory in communication with the broadcast source of traffic information and the mobile network source of traffic information;
    placing a mobile communication device in communication with the onboard vehicle navigation device and the server, the mobile communication device serving as a conduit for transmitting route guidance requests from the vehicle navigation device to the server, and for transmitting route guidance data from the server to the vehicle navigation device;
    requesting from the server, by means of the vehicle navigation device and through the mobile communication device, updated route guidance data;
    at the server, upon receipt of a request for updated route guidance data from the vehicle navigation device, causing a software program associated with the server to compare traffic information obtained from the broadcast source with traffic information obtained from the mobile network source, to detect a difference therebetween, and to compare any detected difference to a predetermined difference value;
    transmitting updated route guidance data from the server to the vehicle navigation device only when a detected difference between traffic information from the broadcast source and traffic information from the mobile network source is determined through execution of the software program to exceed the predetermined difference value; and
    upon receipt of the updated route guidance data at the vehicle navigation device, updating the calculated route to the destination.

* * * * *